(12) United States Patent
Theis et al.

(10) Patent No.: US 8,544,811 B2
(45) Date of Patent: Oct. 1, 2013

(54) SPRING ARM LIFT SYSTEMS

(75) Inventors: John Theis, St. Paul, MN (US); Saeb Asamarai, Columbia Heights, MN (US); Peter Segar, Burnsville, MN (US); John Cain, St. Cloud, MN (US)

(73) Assignee: Ergotron, Inc., St. Paul, MN (US)

( * ) Notice: Subject to any disclaimer, the term of this patent is extended or adjusted under 35 U.S.C. 154(b) by 194 days.

(21) Appl. No.: 12/945,068

(22) Filed: Nov. 12, 2010

(65) Prior Publication Data

US 2011/0278424 A1    Nov. 17, 2011

Related U.S. Application Data

(60) Provisional application No. 61/261,083, filed on Nov. 13, 2009, provisional application No. 61/261,061, filed on Nov. 13, 2009.

(51) Int. Cl.
*A47G 29/00* (2006.01)

(52) U.S. Cl.
USPC ................ 248/372.1; 248/176.1; 248/178.1; 248/371

(58) Field of Classification Search
USPC ............ 248/371, 372.1, 176.1, 178.1, 183.2, 248/183.3, 288.11, 291.1, 297.11, 292.11
See application file for complete search history.

(56) References Cited

U.S. PATENT DOCUMENTS

| | | | |
|---|---|---|---|
| 2,151,877 A * | 3/1939 | Walker | 248/123.2 |
| 3,756,585 A | 9/1973 | Mihalcheon | |
| 4,220,053 A | 9/1980 | Barlow et al. | |
| 4,253,350 A | 3/1981 | De Tarr | |
| 4,494,177 A * | 1/1985 | Matthews | 362/402 |
| 5,037,059 A | 8/1991 | Asano et al. | |
| 5,054,162 A | 10/1991 | Rogers | |
| 5,706,739 A | 1/1998 | Shaheen et al. | |
| 6,113,045 A | 9/2000 | Wang | |
| 6,113,046 A | 9/2000 | Wang | |
| 6,994,306 B1 | 2/2006 | Sweere et al. | |
| 6,997,422 B2 | 2/2006 | Sweere et al. | |
| 7,032,870 B2 | 4/2006 | Sweere et al. | |
| 7,506,853 B2 | 3/2009 | Sweere et al. | |
| 7,626,569 B2 * | 12/2009 | Lanier | 345/156 |

(Continued)

FOREIGN PATENT DOCUMENTS

| | | |
|---|---|---|
| WO | 2004018927 A1 | 3/2004 |
| WO | 2005012783 A2 | 2/2005 |
| WO | 2006036889 A2 | 4/2006 |

OTHER PUBLICATIONS

International Search Report and Written Opinion for International Application No. PCT/US2010/056456, dated Jan. 25, 2011, 11 pages.

(Continued)

*Primary Examiner* — Amy J. Sterling
(74) *Attorney, Agent, or Firm* — Fredrikson & Byron, P.A.

(57) ABSTRACT

A display positioning apparatus is provided for lifting, supporting, and/or positioning a load, such as a display. The apparatus includes a base and a lift arm adapted to couple to a display, the lift arm pivotally coupled to the base providing a range of travel. A balance mechanism is operatively coupled to the lift arm and the base to counterbalance the lift arm and display. In some cases the balance mechanism includes a torquing spring member to counterbalance the lift arm and an attached display along the range of travel.

25 Claims, 13 Drawing Sheets

(56) References Cited

U.S. PATENT DOCUMENTS

| | | |
|---|---|---|
| 2004/0250635 A1 | 12/2004 | Sweere et al. |
| 2005/0034547 A1 | 2/2005 | Sweere et al. |
| 2005/0139734 A1 | 6/2005 | Sweere et al. |
| 2005/0184215 A1 | 8/2005 | Lin |
| 2006/0130713 A1 | 6/2006 | Jones et al. |
| 2006/0185563 A1 | 8/2006 | Sweere et al. |
| 2007/0272375 A1 | 11/2007 | Hansen |
| 2007/0278364 A1 | 12/2007 | Jang |
| 2008/0277552 A1* | 11/2008 | Duval ................. 248/280.11 |
| 2009/0014131 A1 | 1/2009 | Mullet et al. |
| 2010/0176254 A1 | 7/2010 | Sweere et al. |
| 2010/0193653 A1 | 8/2010 | Sweere et al. |

OTHER PUBLICATIONS

International Search Report and Written Opinion for International Application No. PCT/US2010/056457, dated Jan. 14, 2011, 15 pages.

* cited by examiner

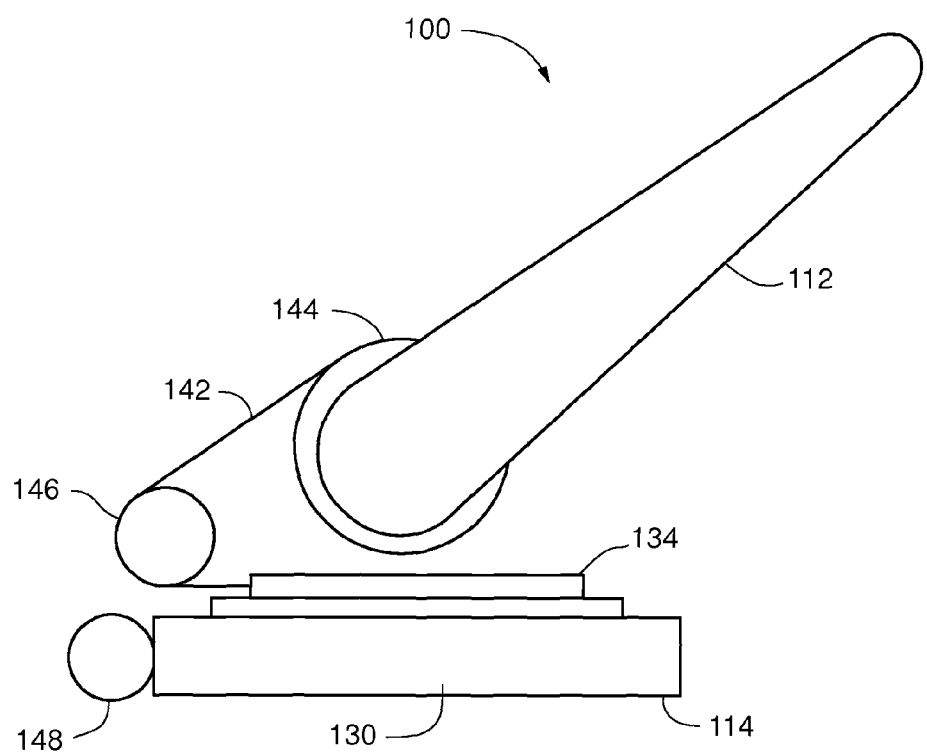

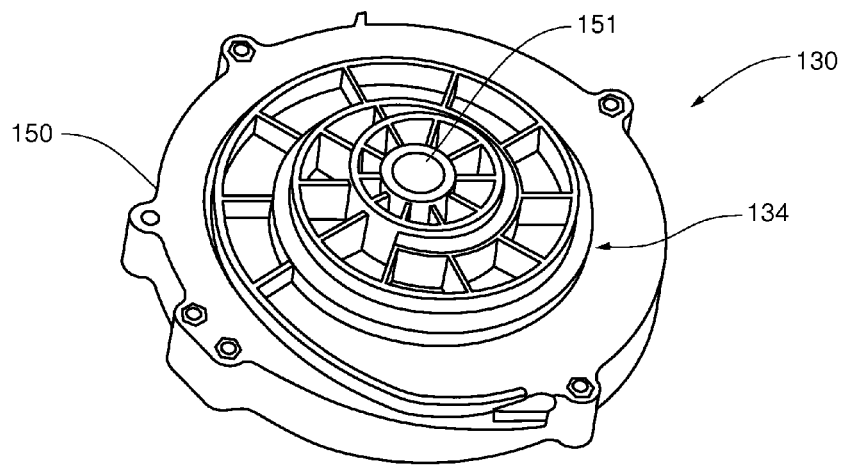
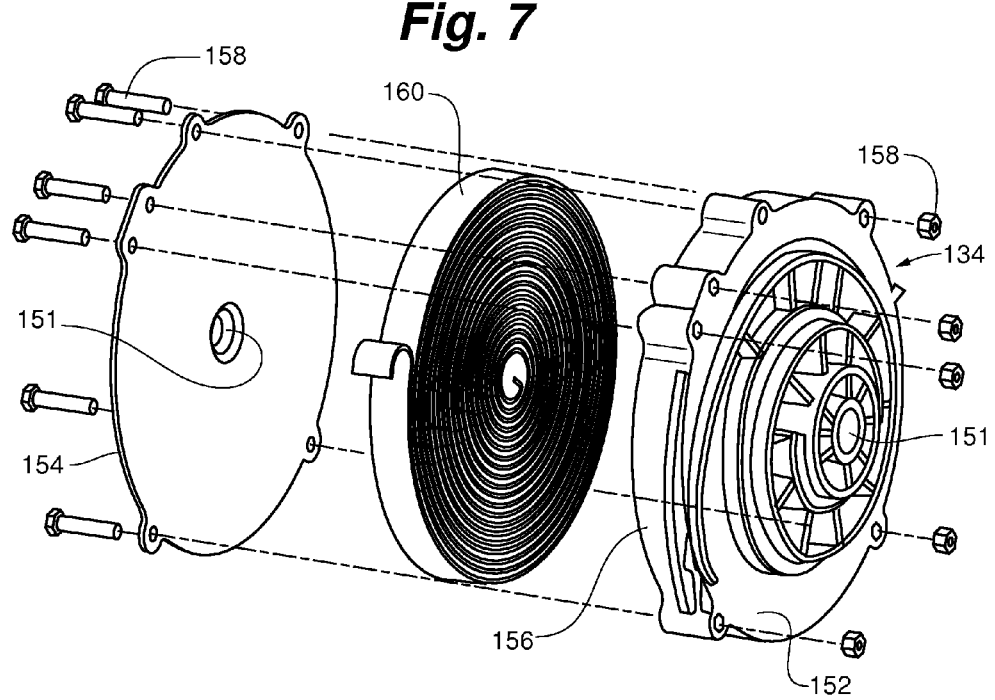

SPRING ARM LIFT SYSTEMS

RELATED APPLICATIONS

This application claims the benefit of U.S. Provisional Application Ser. Nos. 61/261,061 and 61/261,083, both titled Spring Lift Systems, and both filed Nov. 13, 2009, the entire contents of both of which are hereby incorporated by reference.

FIELD

The present invention relates generally to an apparatus for lifting, supporting, and/or positioning a load. In particular embodiments, the invention specifically relates to display positioning assemblies and methods for lifting, supporting, and/or positioning a display with respect to a support surface.

BACKGROUND

In recent years, ergonomic concerns have taken on increased importance due to several factors. For example, workers are often able to be more productive when working in an ergonomically-friendly environment. Moreover, when workers are forced to work in ergonomically unsuitable environments, they may be injured and/or may perform at a sub-standard level. In addition, ergonomically-friendly consumer products (e.g., computers and monitors/displays, flat screen televisions, etc.) have also taken on an increased importance outside the workplace.

Many tasks involve working with personal computers and/or display monitors. For example, in some jobs personal computers and/or display monitors may be used by multiple operators at different times during a day. In some settings, one computer and/or display may be used by multiple people of different sizes and having different preferences in a single day. Given the differences in people's size and differences in their preferences, a monitor or display adjusted at one setting for one individual may be inappropriate for another individual. For instance, a child would have different physical space needs than an adult using the same computer and monitor.

In many contexts, operators are using computers for longer periods of time, which increases the importance of comfort to the operator. An operator may choose to use the display as left by the previous user despite the discomfort, annoyance, and inconvenience resulting from using settings optimized for another individual. This type of situation may result in sub-standard performance and even injury after prolonged use.

In some situations, people must perform operations in various postures. For example, one may be required to perform some operations in a seated position and others in a standing position. In such situations, both the seated operations and the standing operations may require the same workstation. Such workstations may include a computer monitor (i.e., display), a keyboard, and/or a mouse.

Moreover, as displays grow in size and weight, ease of adjustability is an important consideration. For displays requiring frequent adjustment, adjustability for displays has been provided using an arm coupled with gas springs, where the arm is hingedly coupled with the desk or a vertical surface. However, the gas springs are costly and the gas may leak out over time. In addition, the gas springs require a significant amount of space, for instance arm length, which can be at a premium in certain applications, such as in hospitals.

SUMMARY

Embodiments of the invention may be implemented in various contexts to raise and lower a multitude of objects. Further, embodiments of the invention may assist a load through an arcing range of travel (e.g., raising and lowering about a pivot axis). Examples include raising and lowering displays, including video monitors, televisions and computing equipment of all sizes, furniture work surfaces, production assembly tools and lifts, work load transfer equipment, exercise equipment, and robot control devices.

Some embodiments of the invention may support a display monitor (e.g., a flat panel display such as an liquid crystal display or plasma display) for a personal computer or television. Some situations may not be conducive to placing personal computers and/or display monitors directly on a desk or on a computer case. In some embodiments, computer displays may be mounted on elevating structures to increase desk space or to respond to the ergonomic needs of different operators. In some embodiments of the present invention, displays may be mounted to a surface (e.g., a wall) instead of placing the display on a desk or a cart.

Embodiments of the invention may provide one or more of the following advantages. For example, embodiments of the invention may provide high reliability at a relatively low cost. Some embodiments may be manufactured and/or maintained in a more cost-effective manner than applications using, for example, electrical motors, hydraulic motors, or gas springs as their power source. To illustrate, some embodiments of the invention use a relatively inexpensive spiral spring which costs considerably less than a gas spring.

According to one aspect of the invention, a display positioning apparatus is provided including a base, a lift arm pivotally coupled to the base, and a balance mechanism coupled to the base and the lift arm. The lift arm is coupled to the base about a pivot axis which provides a range of travel for the lift arm. The lift arm is further adapted to couple with a display in order to move the display along the range of travel. In some embodiments the balance mechanism consists essentially of a torquing spring member counterbalancing the lift arm and the display along the range of travel. In some embodiments the torquing spring member may be a spiral spring. In some embodiments a tensioning mechanism is provided for adjusting a tension of the torquing spring member.

According to another aspect of the invention, a display positioning apparatus is provided including a lift arm pivotally coupled to a base about a pivot axis. The lift arm pivots through a range of travel and is adapted to couple with a display in order to move the display along the range of travel. In some embodiments the display positioning apparatus includes an elongated tension member coupled to the lift arm. A cam member may be coupled to the tension member and rotatably supported by the base. In some cases the cam member has a cam surface for winding the tension member as the cam member rotates in a first direction, and for unwinding the tension member as the cam member rotates in a second direction. The display positioning apparatus further includes a torquing spring member engaged with the cam member, which provides a force opposing rotation of the cam member. The torquing spring member and the cam member counterbalance the lift arm and the display along the range of travel.

According to another aspect of the invention, a display positioning apparatus is provided including a base, a lift arm pivotally coupled to the base, and a balance mechanism operatively coupled to the base and the lift arm. The lift arm is adapted to couple with a display and moves along with the display through a range of travel with respect to the base. The balance mechanism counterbalances the lift arm to move the lift arm and the display along the range of travel. In some cases the balance mechanism includes a housing containing a torquing spring member having a first end engaged with the housing and a second end rotatable with respect to the housing. In some cases the housing has a cam member operatively coupled to the lift arm.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 5E is a side schematic view of a display positioning apparatus showing a balance mechanism in accordance with an embodiment of the invention.

FIG. 6 is a perspective view of a balance mechanism in accordance with an embodiment of the invention.

FIG. 7 is an exploded view of the balance mechanism of FIG. 6 in accordance with an embodiment of the invention.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Certain embodiments of the invention are directed to mechanisms and systems incorporating one or more torquing spring members (e.g., a spiral spring) for lifting, supporting, and/or positioning a load along a range of travel. In some cases, the range of travel includes a vertical portion with respect to a support surface, providing a height-adjustable display positioning apparatus. For example, the range of travel may be substantially vertical or both vertical and horizontal. In some cases, a display positioning apparatus provides forces that move a load through an arcing range of travel (e.g., raising and lowering about a pivot axis).

As discussed further herein, certain embodiments are adapted for positioning and supporting a display, such as a computer monitor, a television, a screen, or other type of display. For example, certain embodiments provide a display positioning apparatus that allows a user to reposition a computer monitor or other display along a range of travel. Certain embodiments of the invention provide monitor lift arms or monitor lift mechanisms. Some embodiments of the invention provide positioning apparatuses and lift mechanisms for positioning objects other than displays.

Figure 1:
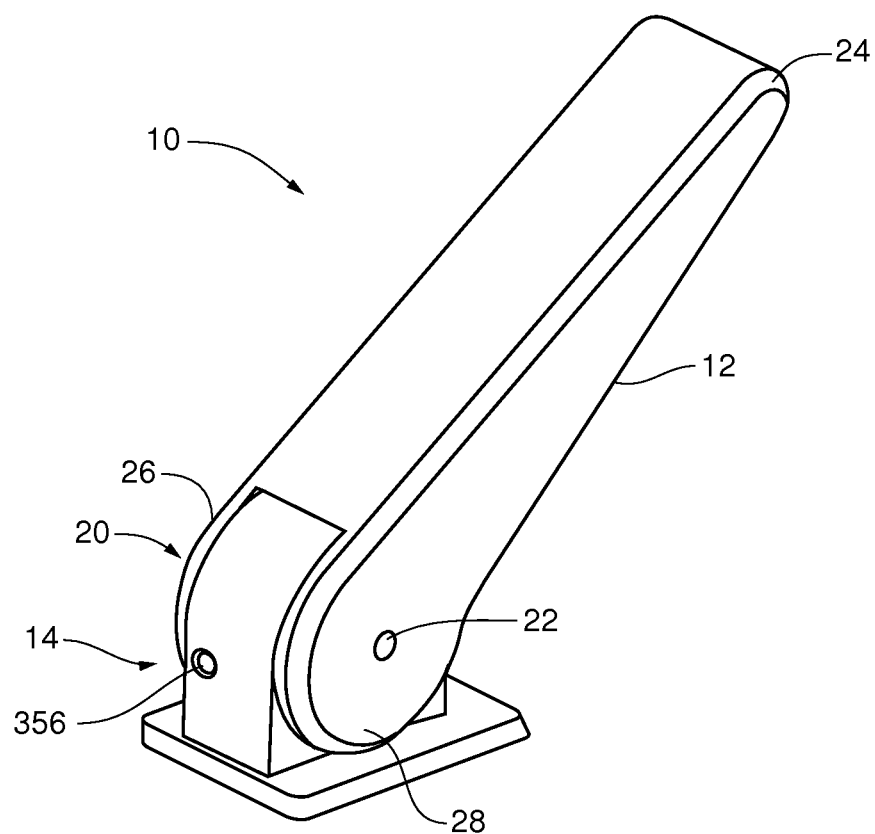
FIG. 1 is a perspective view of a display positioning apparatus in accordance with an embodiment of the invention.

FIG. 1 is a perspective view of a display positioning apparatus 10 in accordance with an embodiment of the invention. The positioning apparatus 10 may take a variety of forms. As shown in FIG. 1, in the embodiments described herein the positioning apparatus 10 is illustrated in the form of a pivoting lift mechanism, providing height-adjustability for an object (e.g., a display, not shown) coupled to the positioning apparatus. The apparatus 10 generally includes a lift arm 12 functionally coupled to a base 14.

In some embodiments a proximal end 20 of the lift arm 12 is pivotally coupled to the base 14 about a pivot axis 22 and a distal end 24 of the lift arm is adapted to couple with an object (e.g., a display). As the lift arm 12 pivots about the pivot axis 22, the distal end 24 of the lift arm 12 is raised and lowered along with the attached object (e.g., a display). In some cases the proximal end 20 of the lift arm 12 couples to the pivot axis 22 and the base 14 via extensions 26, 28 that attach about the pivot axis 22 on either side of the base 14. The extensions 26, 28 provide a stable and reliable design for the lift arm.

Figure 2:
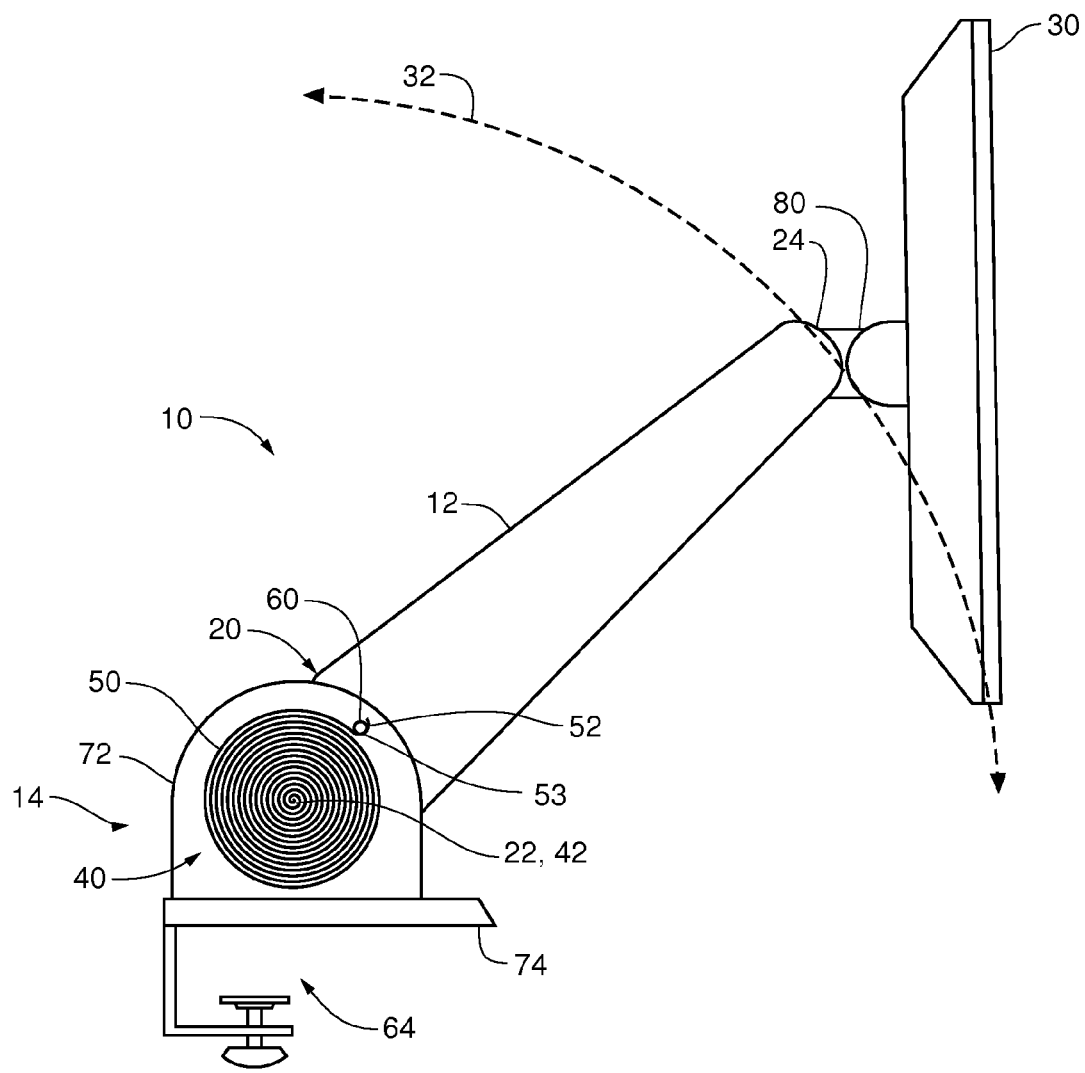
FIG. 2 is a partial cross-sectional view of a display positioning apparatus in accordance with an embodiment of the invention.

FIG. 2 is a partial cross-sectional view of the display positioning apparatus 10 coupled to a display 30 in accordance with an embodiment of the invention. The proximal end 20 of the lift arm 12 is movably coupled to the base 14 about pivot axis 22. The distal end 24 of the lift arm is coupled to the display 30. In general, the positioning apparatus 10 functions to move the display 30 along a range of travel 32 and allows the attached display 30 to be positioned at a variety of locations relative to a support surface (not shown). As the lift arm 12 moves through the range of travel 32, it raises and lowers the display 30 providing height adjustability for the display.

The range of travel 32 can vary depending upon the desired performance. In some embodiments, the range of travel 32 extends between a lower position corresponding to a lift arm angle of about 0 degrees with respect to a horizontal plane (e.g., with the lift arm 12 substantially horizontal plus or minus a few degrees) and a higher position corresponding to a lift arm angle of about 80 or about 90 degrees with respect to the horizontal plane (e.g., with lift arm substantially vertical plus or minus a few degrees). In some embodiments the lift arm 12 may adjust to provide between about 3 inches and about 20 inches of lift for an attached display 30. Of course, greater and lesser heights and ranges of travel may also be provided depending upon the desired functionality.

In some embodiments of the invention, the apparatus 10 includes a balance mechanism 40 that assists in raising and/or lowering the lift arm 12 against the weight of the attached display 30. For example, the balance mechanism 40 can provide a force counteracting the weight of the lift arm 12 and the attached display as they move through the range of travel 32. The balance mechanism 40 may thus provide a degree of lift assistance to a user adjusting the position of the display 30. In some embodiments, the balance mechanism 40 also balances the weight of the lift arm 12 and the display 30 with respect to the base 14 and the supporting surface (not shown). In some embodiments the balance mechanism allows a user to position a display at any one of an infinite number of locations along a range of travel. Further, the balance mechanism can be used to maintain the desired position of the display, such that no locking mechanism must be engaged or disengaged before or after the display is moved to a new desired position.

According to some embodiments, the balance mechanism 40 is operatively coupled between the base 14 and the lift arm 12. In some cases the balance mechanism 40 is rotatably coupled and supported by the base 14 about an axis of rotation 42 provided by an axle coupled to the base 14. In some embodiments the axis of rotation 42 is substantially parallel to the pivot axis 22. In some cases, the pivot axis 22 is also the axis of rotation 42.

In some embodiments the balance mechanism 40 includes a torquing spring member. The torquing spring member provides a force that counteracts the weight of the lift arm 12 and the attached display as they move through the range of travel 32. The torquing spring member may thus provide a degree of lift assistance. In some embodiments, the torquing spring member is configured to allow positioning of the lift arm 12 and the display 30 at an infinite number of positions along the range of travel 32.

Generally, the torquing spring member is a spring or other energy mechanism that provides torque about an axis of rotation. In some embodiments the balance mechanism 40 consists of or consists essentially of a torquing spring member in the form of a spiral spring 50. In such embodiments, the spring may have a first end directly coupled to a base and a second end directly coupled to a lift arm, with no other counterbalancing elements. In these cases the spiral spring 50 provides a simple, effective, and reliable balance mechanism for the lift arm 12. Generally, the torquing spring member is a spring or other energy mechanism that provides torque about an axis of rotation. In the embodiments described herein, the torquing spring member is configured as a spiral spring. In some embodiments the torquing member includes a flat strip of material (e.g., metal) with a generally rectangular cross-section wound into a coil with equal or variable space between the coils, where the entire coil resides within a single plane. However, the torquing spring member may be configured as any suitable energy mechanism and it is understood that the invention is not limited to any particular configuration. As just a few examples, the torquing spring member may be a torsion spring, a constant torque spring, or a watch spring. Of course, the torquing spring member may also include other types of springs and energy mechanisms known in the art.

Figure 3:
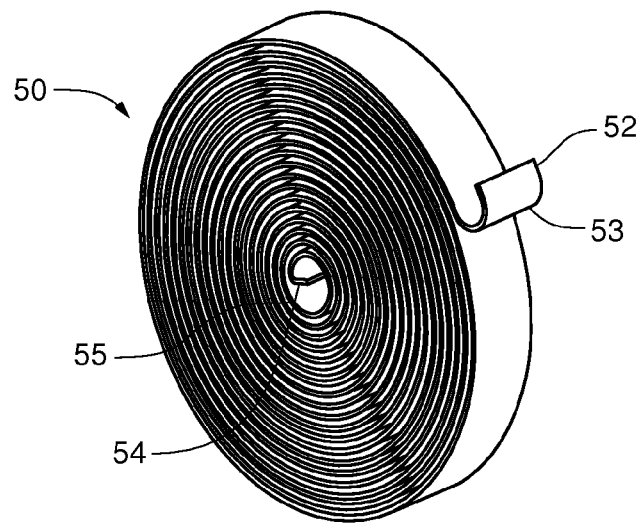
FIG. 3 is a perspective view of a spiral spring in accordance with an embodiment of the invention.

Referring to FIG. 3, a perspective view of the spiral spring 50 is shown in accordance with an embodiment of the invention. According to certain embodiments, the spiral spring 50 comprises a flat wire wound in a spiral from a center or inner diameter to an outer diameter of the spring 50. As seen in FIG. 3, the spiral spring 50 has a substantially flat, disk-like configuration in some embodiments. A first end 52 of the spring at the outer diameter may include a first bend 53 for coupling with or otherwise engaging the lift arm 12 or the base 14. A second end 54 of the spring near the inner diameter can include a second bend 55 for engaging or coupling with the other of the lift arm or base not engaged with the first end 52. For example, turning to FIG. 2, the spiral spring 50 may supported about the axis of rotation 42 provided by an axle coupled to the base 14. In certain embodiments the first end 52 of the spring engages a pin 60 on the lift arm 12 to transmit a spring force to the lift arm 12 relative to the base 14. Although the spiral spring 50 is shown with bends 53, 55 for engaging surrounding structure, the ends of the spring may additionally or alternatively include other attachment features (e.g., clips, screw or bolt holes) known in the art.

With continuing reference to FIG. 2, the pin 60 engages the first end 52 of the spiral spring with the first bend 53 of the spiral spring partially wrapped about the pin 60. As the lift arm 12 pivots about the pivot axis 22, the pin 60 also rotates and engages the spiral spring 50. In certain embodiments the spiral spring 50 tightens or compresses as the lift arm 12 moves down through the range of travel 32, thus providing a spring force urging the pin 60 and the lift arm 12 upwards to counteract the weight of the lift arm 12 and the display 30. As the lift arm 12 and the display 30 move upward through the range of travel 32, the spiral spring unwinds and loosens as the pin 60 rotates in the opposite direction about the pivot axis 22.

As shown in FIG. 2 in some embodiments the balance mechanism 40 is housed within the base 14. The base 14 can include any mechanism useful for supporting or connecting the lift arm 12 to a support surface (not shown), such as a horizontal (e.g., desk top) or vertical (e.g., wall) support surface. For example, as shown in FIG. 2, the base 14 can include a clamp 64 for attaching the apparatus to a desk or other support surface. In other embodiments, the base 14 has a flat surface that is supported underneath by a support surface such as a table or desk top.

In certain embodiments the base 14 includes a pivot portion 72 and a planar portion 74. In some cases the lift arm 12 pivotally couples to the pivot portion 72 of the base 14 about the pivot axis 22. The planar portion 74 of the base can provide a flat surface that contacts the support surface. As shown in FIG. 2, in some cases the pivot portion 72 of the base 14 houses the balance mechanism 40 (e.g., a torquing spring member). For example, in the illustrated embodiment, the spiral spring 50 is mounted about the axis of rotation 42 provided by the axle coupled to the pivot portion 72 of the base. In some cases, the axis of rotation 42 is also the pivot axis 22. In certain embodiments, however, the balance mechanism 40 may be otherwise positioned within the base 14 and it is understood the invention is not limited to any one location or orientation of the balance mechanism 40.

Continuing with FIG. 2, in certain embodiments the lift arm 12 is adapted to couple with the display 30 such as a computer monitor, television, etc., through the use of a coupling 80 comprising one or more fasteners known in the art. For example, the coupling 80 may provide one or more degrees of freedom, allowing the attached display 30 to tilt, rotate or otherwise move with respect to the lift arm 112. In some cases, the lift arm 12 may couple to a mount including a standard Video Electronics Standards Association (VESA) mounting interface for coupling with the display 30.

The components of the display positioning apparatus 10, including the lift arm 12, the base 14, the clamp 64, and the balance mechanism 40 among others, can be manufactured from any suitable material known in the art. In some cases one or more components may be a molded or an extruded polymer. In some embodiments one or more components, such as the balance mechanism 40, may be made from a metal or metal alloy.

Figure 4:
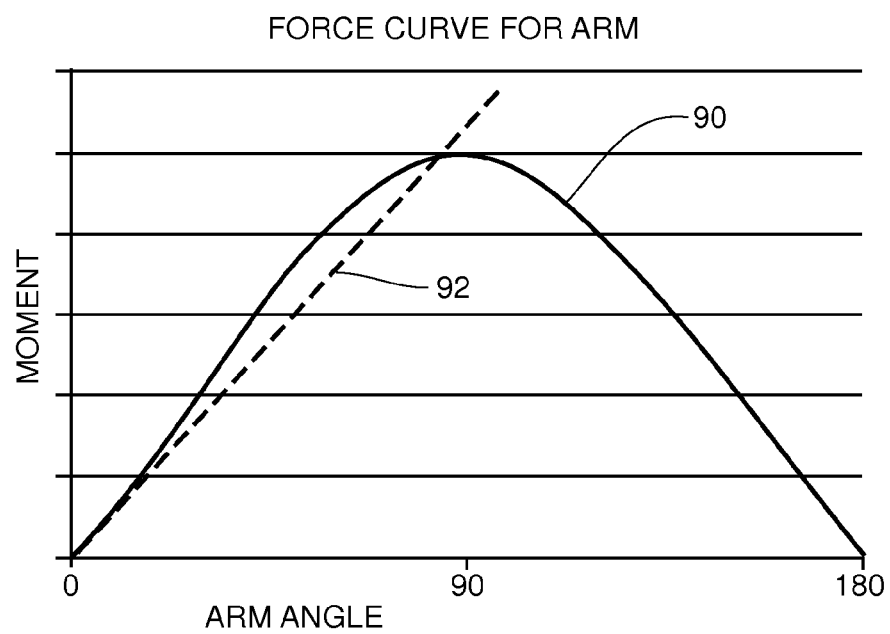
FIG. 4 is an illustration of a force profile for a display positioning apparatus in accordance with an embodiment of the invention.

FIG. 4 is an illustration of a force profile for the display positioning apparatus 10 in accordance with an embodiment of the invention. The solid line 90 illustrates the moment of the lift arm 12 as it moves along a particular range of travel between 0 degrees (e.g., horizontal) to 90 degrees (e.g., vertical) to 180 degrees (e.g., back to horizontal). As shown in the force profile, the dotted line 92 represents the moment of the spiral spring 50 of the display positioning apparatus of FIGS. 1-3. As previously discussed, the spiral spring 50 (i.e., the torquing spring member) can counteract or counterbalance the moment of the lift arm in some embodiments. For example, the moment of the spiral spring 50 in certain cases is approximately equal to the moment of the lift arm 12 between about 0 and about 80-90 degrees. Thus the spiral spring 50 counterbalances the lift arm 12 reasonably well in this range. In certain embodiments, friction may be added to the apparatus 10 (e.g., about the pivot axis 22) to account for the slight differences between the moments of the spiral spring 50 and the lift arm 12, thus providing improved counterbalancing of the lift arm 12 and the display 30.

Figure 5A:
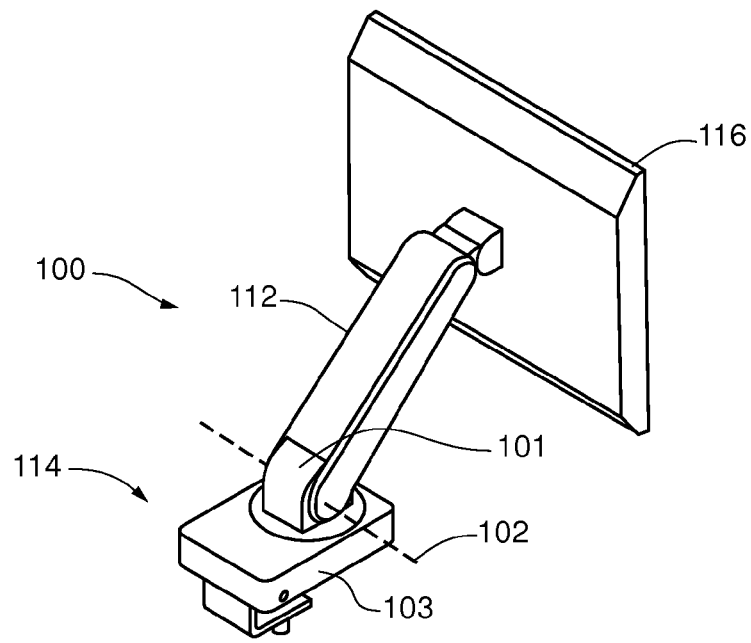
FIG. 5A is a perspective view of a display positioning apparatus in accordance with an embodiment of the invention.
Figure 5B:
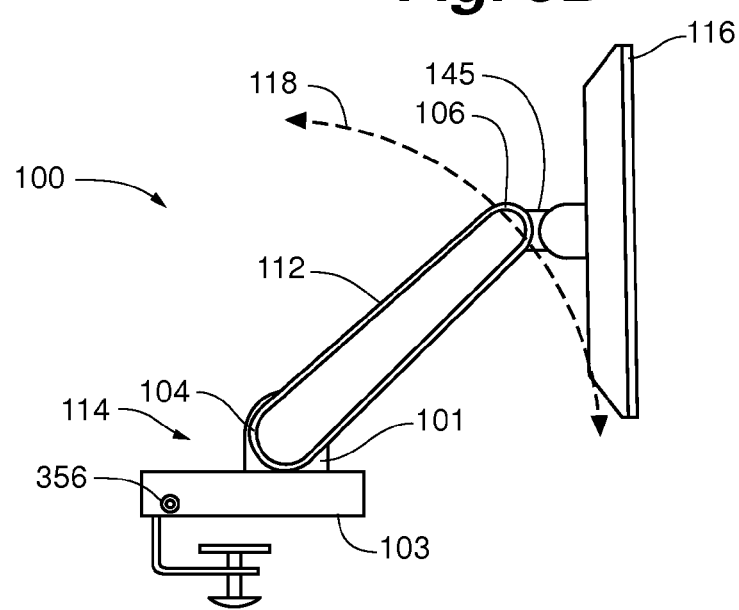
FIG. 5B is a side view of a display positioning apparatus in accordance with an embodiment of the invention.
Figure 5C:
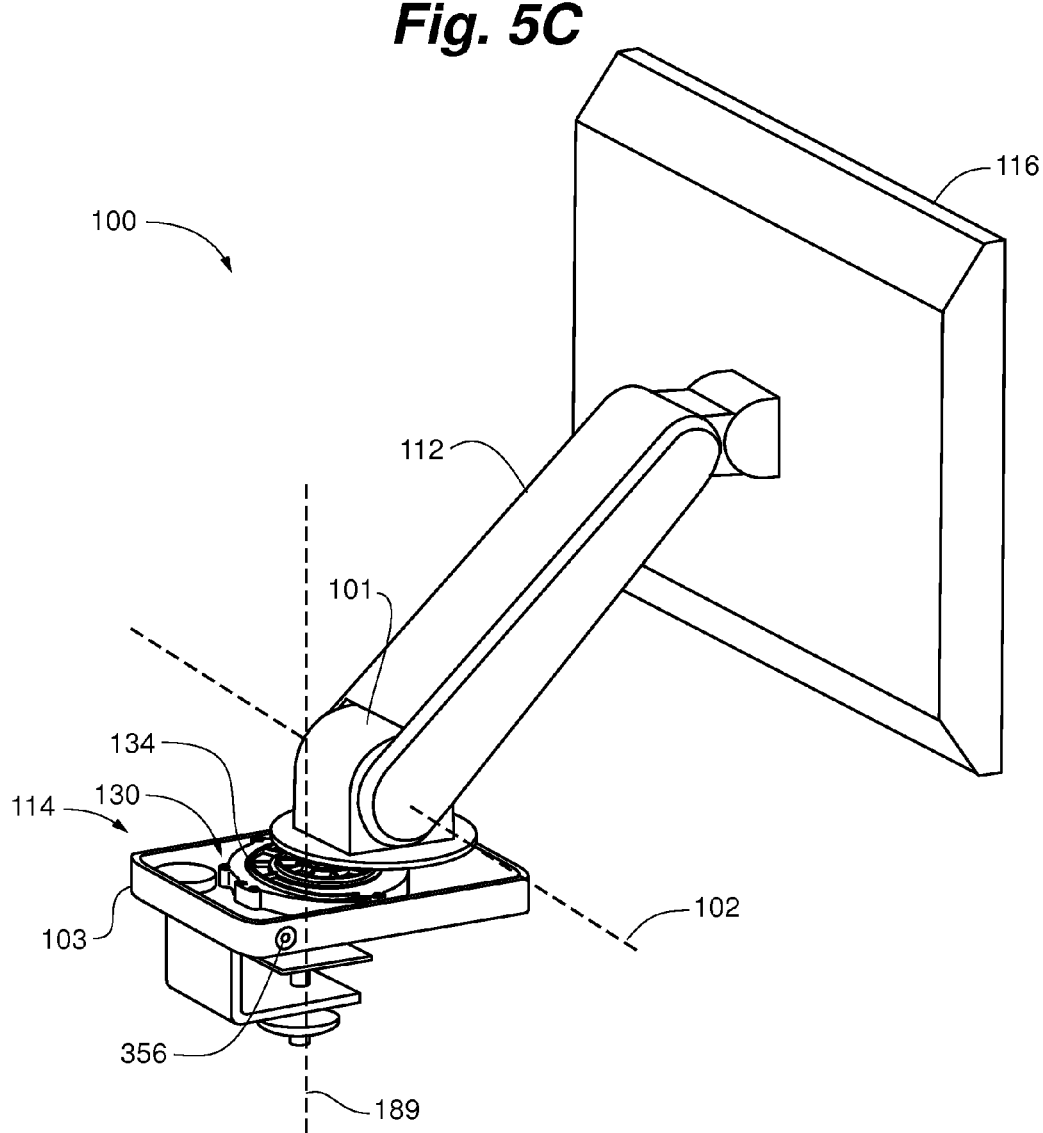
FIG. 5C is a perspective view of a display positioning apparatus showing a balance mechanism in accordance with an embodiment of the invention.

FIGS. 5A-5C illustrate views of another display positioning apparatus 100 in accordance with an embodiment of the invention. The positioning apparatus 100 may take a variety of forms. Turning to FIG. 5A, in the embodiments described herein, the positioning apparatus 100 is illustrated in the form of a pivoting lift mechanism, providing height-adjustability for an attached display 116. The positioning apparatus 100 generally includes a lift arm 112 and a base 114. In some embodiments the base 114 includes a pivot portion 101 and a planar portion 103. The lift arm 112 pivotally couples to the pivot portion 101 of the base 114 about a pivot axis 102. The planar portion 103 of the base can provide a flat surface that contacts the support surface.

Turning to FIG. 5B, in certain embodiments the lift arm 112 is adapted to couple with the display 116 such as a computer monitor, television, etc., through the use of a coupling 145 comprising one or more fasteners known in the art. For example, the coupling 145 may provide one or more degrees of freedom, allowing the attached display 116 to tilt, rotate or otherwise move with respect to the lift arm 112. In some cases, the lift arm 112 may couple to a mount including a standard VESA mounting interface for coupling with the display 116.

The lift arm 112 is movably coupled to the base 114 through a range of travel 118 to allow the attached display 116 to be positioned at a variety of locations relative to a support surface (not shown). In some embodiments a proximal end 104 of the lift arm 112 is pivotally coupled to the base 114 about the pivot axis 102. As the lift arm 112 pivots about the pivot axis 102, a distal end 106 of the lift arm 112 is raised and lowered along the range of travel 118 with the attached display 116.

The range of travel 118 can vary depending upon the desired performance. In some embodiments, the range of travel 118 extends between a lower position corresponding to a lift arm angle of about 0 degrees with respect to a horizontal plane (e.g., with the lift arm 112 substantially horizontal plus or minus a few degrees) and a higher position corresponding to a lift arm angle of about 80 or about 90 degrees with respect to the horizontal plane (e.g., with lift arm substantially vertical plus or minus a few degrees). In some embodiments the lift arm 112 may adjust to provide between about 3 inches and about 20 inches of lift for an attached display 30. Of course, greater and lesser heights and ranges of travel may also be provided depending upon the desired functionality.

As shown in FIG. 5C, in some cases the base 114 houses a balance mechanism 130 operatively coupled between the base 114 and the lift arm 112 to counteract the weight of the lift arm 112 and the attached display 116. For example, the balance mechanism 130 may provide lift assistance to counter the weight of the lift arm 112 and the display 116. In some embodiments, the balance mechanism 130 also balances the weight of the lift arm 112 and the display 116 with respect to the base 114 and the supporting surface (not shown).

According to certain embodiments, the balance mechanism 130 is positioned within the planar portion 103 of the base 114, relatively flat and perpendicular with respect to the lift arm 112. For example, the balance mechanism 130 may be rotatably coupled and supported by the base 114 about an axis of rotation 189 provided by an axle (not shown) coupled to the base 114. Thus, as seen in FIG. 5C, the cam member 134 and the spiral spring 160 rotate in planes substantially perpendicular to a plane parallel with the length of the lift arm 112. Accordingly, the axis of rotation 189 for the balance mechanism is substantially perpendicular to the pivot axis 102 of the lift arm 112. As seen in FIG. 5C, this orientation allows the balance mechanism 130 to be positioned within the relatively flat and thin planar portion 103 of the base 114, providing a space-saving configuration. In addition, it is understood that the invention is not limited to any particular orientation of the balance mechanism 130 and that the balance mechanism can be mounted in a variety of orientations (e.g., slanted, angled, skew, parallel, perpendicular with respect to the lift arm, within the planar and/or pivot portions of the base) while still providing effective and reliable operation. For example, in some cases the balance mechanism 130 may be substantially parallel to the lift arm with the axis of rotation substantially parallel to the pivot axis 102. In certain embodiments, the axis of rotation 189 may also be the pivot axis 102.

Returning to FIG. 5C, an elongated tension member (e.g., a line, not shown) couples the balance mechanism 130 to the lift arm 112 and transmits forces between the balance mechanism and the lift arm as the lift arm 112 is raised and lowered. For example, the tension member may be coupled to an inside attachment point proximate the distal end of the lift arm 112 and extend through the lift arm 112 to the balance mechanism 130 in the base 114. In cases where the balance mechanism 130 is positioned with the planar portion of the base 114, one or more direction-changing members (e.g., pulleys) route the tension member from the lift arm through the pivot portion of the base to the balance mechanism.

The tension member can comprise any suitable elongated member capable of transmitting tensile forces between the balance mechanism and the bracket. For example, the tension member can be a line, cord, string, rope, cable, chain, ribbon, belt, or another such member known in the art. Some embodiments of the invention described herein include a tension member with a line configuration. However, it is understood that in some embodiments the line can be replaced with another configuration and that the invention is not limited to any particular form of tension member.

The tension member can be formed of any material known in the art suitable for the desired application (e.g., natural fibers, metal, polymer, single-strand, cable). In some embodiments, to further provide high reliability over a long life at a relatively low cost, the tension member has a line configuration produced from materials including high tensile strength polymers. Such tensile polymers provide greater reliability over a longer useful life than wound metal cables. For example, a typical computer stand mechanism built with a steel cable will break in less than 500 cycles, while an engineered polymer fiber rope may exceed 10,000 cycles. Polymeric fibers may comprise, for example, aromatic polyester liquid crystal polymers, amid fibers, or other high tensile strength synthetic fibers woven into a rope configuration.

With continuing reference to FIG. 5C, in some embodiments the balance mechanism 130 includes a torquing spring member (not shown). The torquing spring member provides a force that counteracts the weight of the lift arm 112 and the attached display as they move through the range of travel 118. The torquing spring member may thus provide a degree of lift assistance. In some embodiments, the torquing spring member is configured to allow positioning of the lift arm 112 and the display 116 at an infinite number of positions along the range of travel 118. The torquing spring member may also be used to facilitate maintaining a desired position of a display.

In certain embodiments the balance mechanism 130 also includes a cam member 134 coupled to the torquing spring member. As the balance mechanism rotates with respect to the base 114, the cam member 134 engages the tension member (e.g., line), and in some embodiments, the cam member 134 and torquing spring member provide a moment to counterbalance the moment of the lift arm 112 and the display 116 throughout the range of travel 118. The display positioning apparatus 100 may allow positioning of the display 116 at an infinite number of positions along the range of travel. In some embodiments the spiral spring and the cam member 134 allow a user to move the display throughout the range of travel with a substantially constant force. As shown in FIG. 4, in some cases a torquing spring member such as a spiral spring has a force profile that by itself only approximately counterbalances the changing moment of the lift arm 112 and the display 116. In some embodiments the cam member 134 modifies the force profile of the torquing spring member (instead of or in addition to adding a frictional component as described above) so that the balance mechanism 130 more closely counterbalances the lift arm and display throughout the range of travel 118.

Figure 5D:
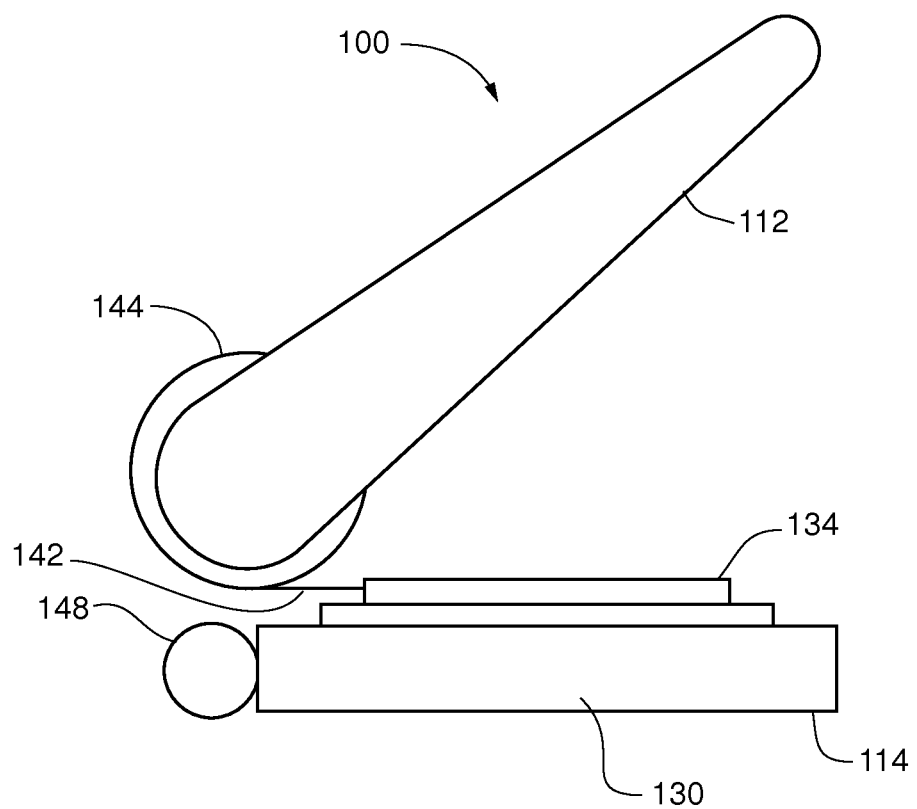
FIG. 5D is a side schematic view of a display positioning apparatus showing a balance mechanism in accordance with an embodiment of the invention.

FIGS. 5D and 5E show schematic representations of two embodiments of display positioning apparatuses 100. In FIGS. 5D and E, an elongated tension member 142 (e.g., a line) couples the balance mechanism 130 to the lift arm 112 and transmits forces between the balance mechanism and the lift arm as the lift arm 112 is raised and lowered. In the embodiment shown in FIG. 5D, a wheel 144 is connected to the arm 112, and the line 142 is connected to the wheel 144. Wheel 144 rotates when the arm is pivoted. As shown, the line 142 is also connected to cam 134. Accordingly, pivoting the arm causes the cam and the torquing spring member to turn. In the embodiment shown in FIG. 5E, the line 142 is routed through a pulley 146 between wheel 144 and cam 134. Of course, more than one pulley, and different pulley orientations, may be provided. In both embodiments, a gear mechanism 148 may be provided to adjust the tension of the torquing spring member in the balance mechanism 130. Also as shown, a bottom surface of the balance mechanism 130 may serve as the base 114.

FIG. 6 is a perspective view of a balance mechanism 130 in accordance with an embodiment of the invention. In this embodiment, the balance mechanism includes a housing 150, which contains the torquing spring member to provide a counterbalancing force for the display positioning apparatus 100. The cam member 134 is formed on one surface of the housing 150.

As discussed above, the torquing spring member is generally a spring or other energy mechanism that provides torque about an axis of rotation. Turning to FIG. 7, in some embodiments the torquing spring member is configured as a spiral spring 160. In these cases the spiral spring 160 provides a simple, effective, and reliable balance mechanism for the lift arm 112. However, the torquing spring member may be configured as any suitable energy mechanism and it is understood that the invention is not limited to any particular configuration. As just a few examples, the torquing spring member may be a torsion spring, a constant torque spring, or a watch spring. Of course, the torquing spring member may also include other types of springs and energy mechanisms known in the art.

FIG. 7 is an exploded assembly view of the balance mechanism 130 showing the spiral spring 160 (i.e., torquing spring member) positioned side-by-side with the cam member 134 in a compact and space-saving form factor. In some embodiments the housing 150 includes a first end plate 152, a second end plate 154, and a wall 156 coupled together with one or more fasteners 158. As shown, in some embodiments the housing 150 defines a cavity that receives the spiral spring 160. For example, the spiral spring 160 may be contained within the wall 156 of the housing between the first and the second end plates 152, 154. In some embodiments the housing (e.g., the first and second end plates) includes an axle opening 151 that receives an axle for rotating the balance mechanism 130. Of course, the housing 150 may take a variety of forms and one or more portions described herein as individual portions may optionally be integrally formed rather than coupled together through fasteners. In addition, in some embodiments the cam member 134 and the spiral spring 160 may be coupled together without the need for the housing 150 illustrated in FIGS. 6 and 7. For example, the cam member 134 may be incorporated into a wheel that does not contain nor encompass the spiral spring 160. In this case, the cam member 134 and the spiral spring 160 may be coupled together through an additional link, line or other structure known in the art.

Figure 8A:
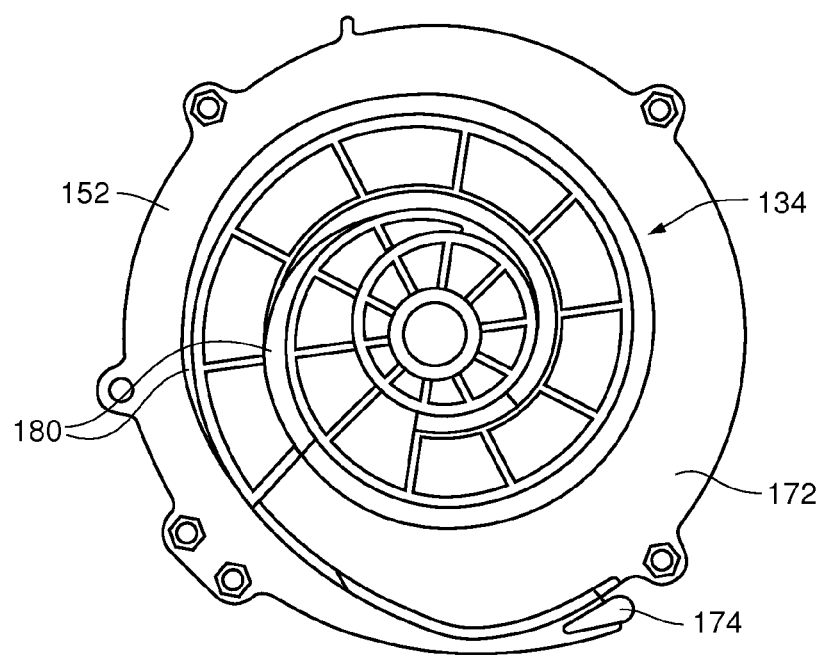
FIG. 8A is an end view of a housing portion including a cam member in accordance with an embodiment of the invention.
Figure 8B:
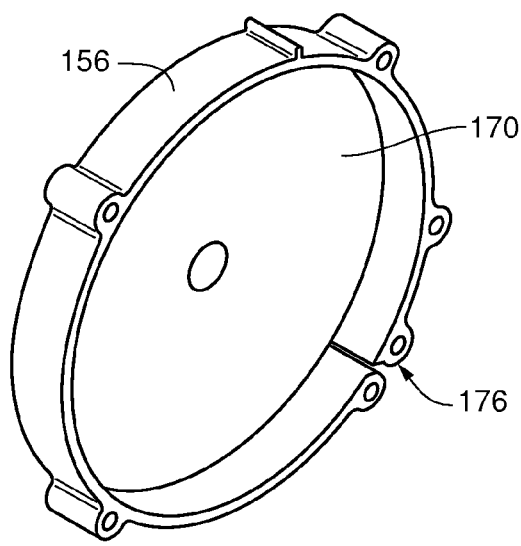
FIG. 8B is a perspective view of the housing portion of FIG. 8A in accordance with an embodiment of the invention.
Figure 8C:
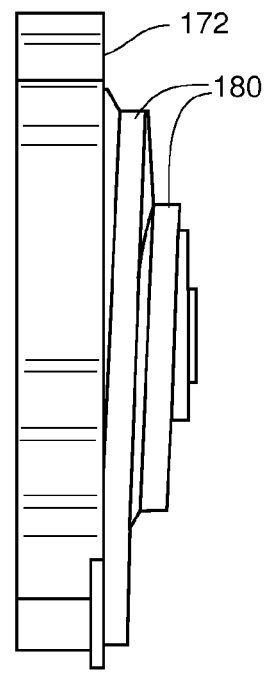
FIG. 8C is a side view of the housing portion of FIG. 8A in accordance with an embodiment of the invention.

FIGS. 8A-8C are views of a portion of the housing 150 including the cam member 134 in accordance with an embodiment of the invention. In this embodiment, the first end plate 152 and the wall 156 of the housing are integrally formed, for example as a cast polymer or metal component. The first end plate 152 includes an interior first surface 170 and an exterior second surface 172 which comprises the cam member 134. In this embodiment the cam member 134 is an integral part of the first end plate 152, although in some embodiments the cam member 134 may be separately formed and coupled to the housing 150. An attachment member 174 is provided to couple the cam member 134 and/or housing 150 to the line (i.e., tension member) that is coupled to the lift arm 112. In some cases the attachment member 174 comprises a knob or protrusion around which the line can be fixed. The housing wall 156 also includes an engagement element 176 for engaging the spiral spring 160. In some cases the engagement element 176 comprises a slot in the housing wall that receives an end of the spiral spring, with one or more knobs for arresting movement of the end of the spring.

As shown in FIG. 8A, the cam member 134 includes a cam surface 180 that engages the line coupled to the lift arm. In certain embodiments the cam surface 180 is shaped and contoured so that a variable force applied to the cam member 134 by the spiral spring 160 is transformed into a substantially constant force applied to the line coupled to the cam member 134. Thus, the balance mechanism 130 can incorporate a spring member with a variable force profile, while also providing a substantially constant lift and/or balancing force. The substantially constant lift/balance force provided by this embodiment can provide a display positioning apparatus with adjustability that has increased reliability and predictability, in addition to increased ease of use for a user attempting to adjust the apparatus.

In some embodiments the cam surface 180 is a curved or spiraling surface, extending from an outer diameter to a smaller inner diameter. As shown in FIG. 8A, in some embodiments the cam surface 180 spirals or otherwise extends through an angle of 360 degrees or more. In certain embodiments the line (i.e., tension member) is coupled to the cam member proximate an outer edge of the cam member and initially engages the cam surface along its outer diameter. As the cam member rotates, the line is wound upon or unwound from the cam surface 180 depending upon the direction of rotation. As shown in FIG. 8C, in some embodiments the cam surface 180 projects outward from the second surface 172 of the housing 150 as it spirals inward to accommodate engagement of the line through more than one full rotation of the cam member 134.

According to some embodiments of the invention, the cam member 134 may be produced from a material comprising nylon, cast aluminum, and/or or glass filled polymers. Examples include, but are not limited to RTP 805 TFE5, which is an acetal material with 30% glass fill and 5% PTFE. These materials may comprise glass within a range of about 10-60%. Moreover, such materials may include nylon, acetal, and POM. These materials provide a sturdy and dependable cam member that will not deform over many cycles at a relatively low cost.

Figure 9:
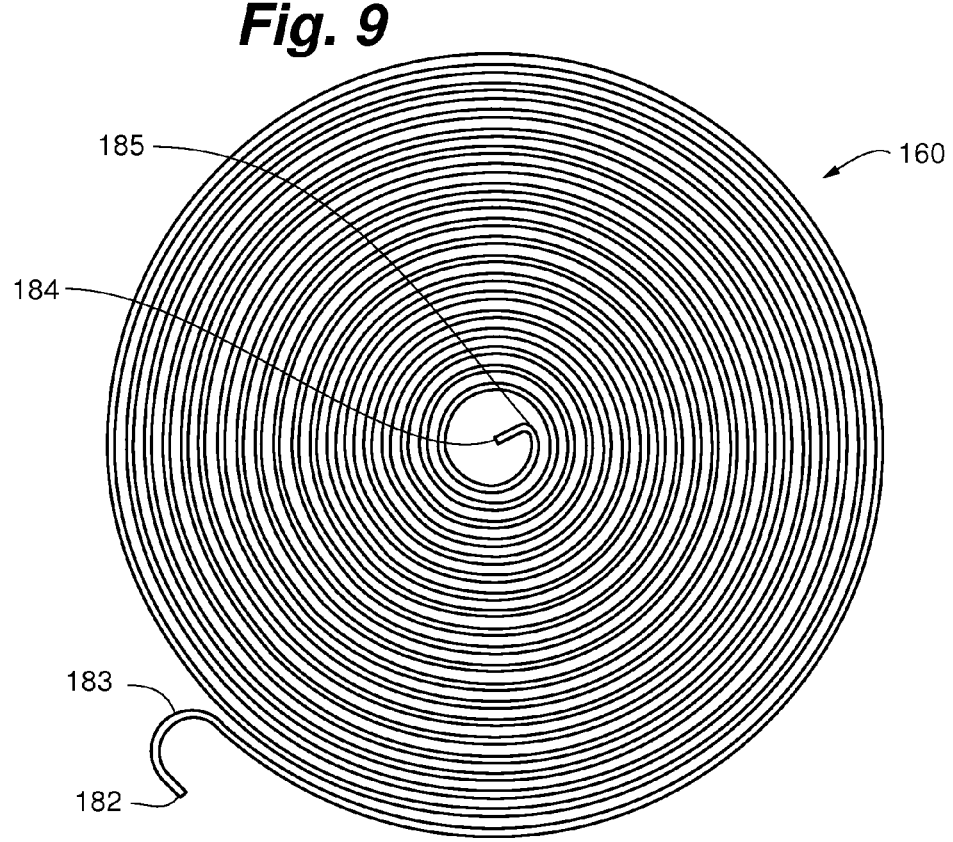
FIG. 9 is a view of a spiral spring in accordance with an embodiment of the invention.

FIG. 9 is a view of the spiral spring 160 in accordance with an embodiment of the invention. According to certain embodiments, the spiral spring 160 comprises a flat wire wound in a spiral from a center or inner diameter to an outer diameter of the spring 160. As seen in FIG. 7, the spiral spring 160 has a substantially flat, disk-like configuration in some embodiments. Returning to FIG. 9, a first end 182 of the spring near the outer diameter may include a first bend 183 for coupling with or otherwise engaging the housing 150 or the cam member 134. A second end 184 of the spring near the inner diameter can include a second bend 185 for engaging or coupling with an axle of the balance mechanism. Although the spiral spring 160 is shown with bends 183, 185 for engaging surrounding structure, the ends of the spring may additionally or alternatively include other attachment features (e.g., clips, screw or bolt holes) known in the art.

The spiral spring 160 preferably, although not necessarily, includes multiple turns or coils between its inner and outer diameters to facilitate a wide range of travel for the lift arm. In some embodiments the spiral spring 160 is configured so that the first end 182 of the spring is rotated with the cam member about the center of the spring one or more times from the spring's free position as the lift arm 112 moves through the range of travel 118.

Figure 10:
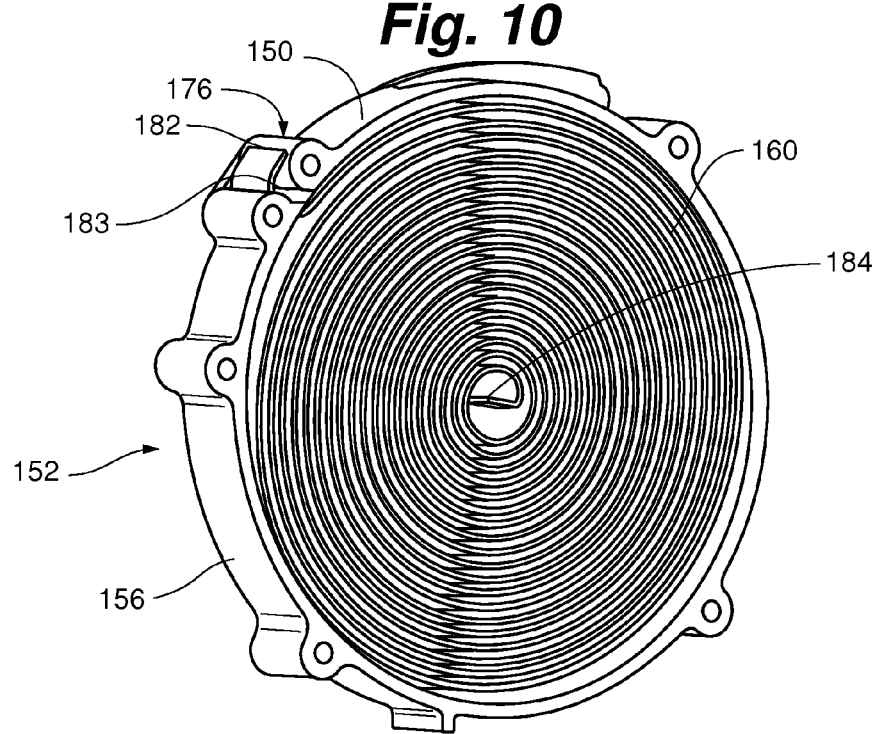
FIG. 10 is a perspective view of a spiral spring mounted within a portion of a housing in accordance with an embodiment of the invention.

FIG. 10 is a perspective view of the spiral spring 160 mounted within a portion of the housing 150 including the housing wall 156 and the first end plate 152. The first bend 183 of the spring is configured to engage with the engagement element 176 of the housing, thus engaging or coupling the outer diameter of the spiral spring 160 to the housing 150, and thus also the cam member 134. In certain embodiments in which the engagement element 176 comprises a slot in the housing wall with one or more knobs, the first end 182 of the spring extends through the slot and the first bend 183 wraps at least partially around one of the knobs to engage the spring. In some embodiments the engagement between the spiral spring 160 and the housing/cam member relies on bends in the spring and accompanying frictional forces between the spring and the housing. Other engagement mechanisms are also envisioned, including fasteners and other known devices for engaging the spring with the housing and cam member.

In some embodiments the first end 182 of the spiral spring is engaged with the housing 150 and cam member 134 and the second end 184 of the spring is held in place while the cam member 134 and the housing rotate about an axis of rotation. Rotating the cam member 134 thus also rotates the first end 182 and outer diameter of the spiral spring 160 with respect to the center of the spring, tightening or loosening the spring depending upon the direction of the cam member's rotation. Tightening the spring 160 creates a spring force counteracting rotation of the cam member 134, thus transmitting a counteracting force to the lift arm through the line coupled between the cam member and the lift arm.

In some embodiments the second end 184 of the spiral spring 160 is held stationary by an axle extending through the axle opening 151 while the cam member 134 rotates. Although not depicted, it is envisioned that in some embodiments a reverse configuration may be used in which the second end 184 or center of the spiral spring 160 is engaged with and rotates with the cam member and housing, while the first end 182 and the outer diameter of the spring are held stationary as the cam member rotates.

Providing the balance mechanism 130 in a form that easily integrates both the cam member 134 and the spiral spring 160 provides a number of advantages over existing balancing arrangements. For example, positioning the spiral spring 160 in close proximity to the cam member simplifies operative connections between the cam member and energy mechanism used to provide the balancing force. As discussed above, in some embodiments the cam member 134 directly engages with the spiral spring 160 (e.g., through the structure of the housing 150), without the need for secondary lines or cables connecting the energy mechanism of the device with the cam member 134. This arrangement simplifies the design of the balance mechanism 130 and provides for more reliable operation.

The close proximity and cooperation of the spiral spring 160, the housing 150, and the cam member 134 in some embodiments also provides a compact balance mechanism that can be incorporated into a display positioning apparatus with minimal space impact. For example, the side-by-side positioning of the cam member 134 and the spiral spring 160 concentrates the balance mechanism in a single location. In addition, the integrated configuration of the cam member 134, housing 150, and the spiral spring 160 provides a self-contained balance mechanism 130 that can be easier to install and remove than individual components.

Figure 11:
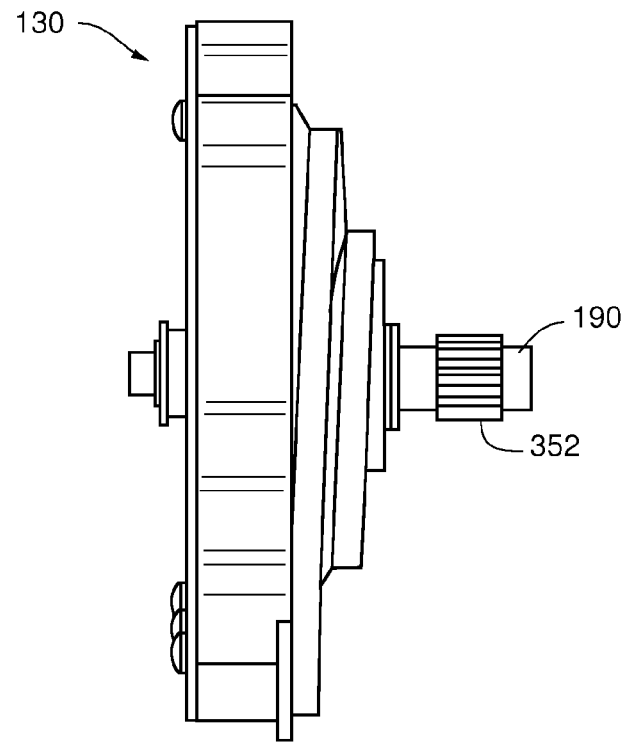
FIG. 11 is a side view of a balance mechanism and an axle in accordance with an embodiment of the invention.
Figure 12:
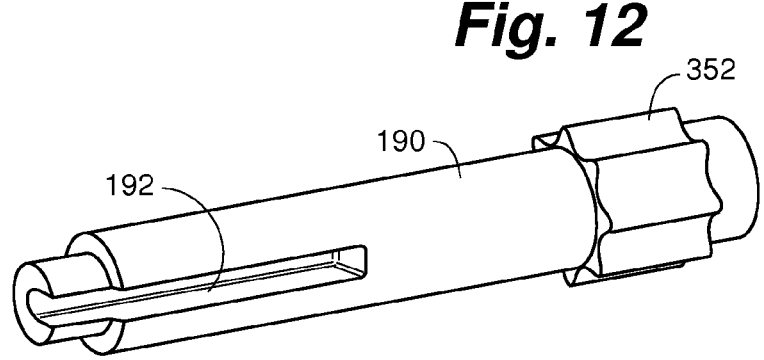
FIG. 12 is a perspective view of an axle in accordance with an embodiment of the invention.

FIG. 11 is a side view of the balance mechanism 130 mounted on an axle 190 in accordance with an embodiment of the invention. The axle 190 may further be mounted to the base 114 or otherwise supported by the display positioning apparatus 100. As shown in FIG. 12, in some embodiments the axle 190 includes a recess 192 configured to receive the second end 184 of the spiral spring 160. For example, the second bend 185 at the second end 184 of the spring may be inserted into the recess 192 to engage the spring with the axle 190. Thus, the axle 190 can maintain the second end 184 of the spring in a fixed position while the balance mechanism 130 rotates about the axle 190, enabling tightening and loosening of the spiral spring 160. Returning briefly to the embodiment shown in FIGS. 1 and 2, the spiral spring 50 (i.e., balance mechanism 40) may also be mounted on an axle similar to the axle 190 shown in FIGS. 11 and 12.

Referring again to the embodiments having a balance mechanism incorporating both a torquing spring member and a cam member, certain embodiments of the invention provide an advantageous positioning of the spiral spring 160 and the cam member 134 within the display positioning apparatus. As perhaps best seen in FIGS. 7, 10, and 11, in some embodiments the spiral spring 160 is positioned coaxially with the cam member 134, with the axis of rotation of the cam member 134 being the center of the spiral spring 160. Such positioning allows the axle 190 to both rotatably support the cam member 134 and hold the second end 184 of the spiral spring 160 stationary with respect to the cam member 134. In addition, the flat, disk-like configuration of the spiral spring 160 allows the spring to be easily positioned side-by-side with the cam member 134, thus saving space and providing a more compact display positioning apparatus, especially when compared with devices employing extension springs, gas-powered springs, and the like.

In certain embodiments of the invention, a display positioning apparatus includes one or more devices for adjusting the tension of the torquing spring member (e.g., spiral spring). For example, in some cases a tensioning mechanism is provided that allows a user to adjustably rotate the axle supporting the spiral spring shown in FIGS. 2 and 10 (and thus the second end of the spring near the spring's inner diameter) with respect to the base, in order to adjust the tension of the spiral spring. The tensioning mechanism may be provided in a number of manners for any of the embodiments of the display positioning apparatus discussed herein.

In one simple embodiment, the tensioning mechanism comprises a direct tensioning mechanism, such as providing an axle (e.g., the spring axle shown in FIG. 12) with a spiraling thread that allows the axle to be directly turned like a screw into the base or through the base into a nut or other fastener. In some embodiments the axle is coupled with a knob or lever for hand manipulation, while in some embodiments the axle is provided with a drive head for a tool, such as a screw driver or ratchet. Turning the axle allows adjustment of the tension of the spiral spring, e.g., for different load weights.

Figure 13A:
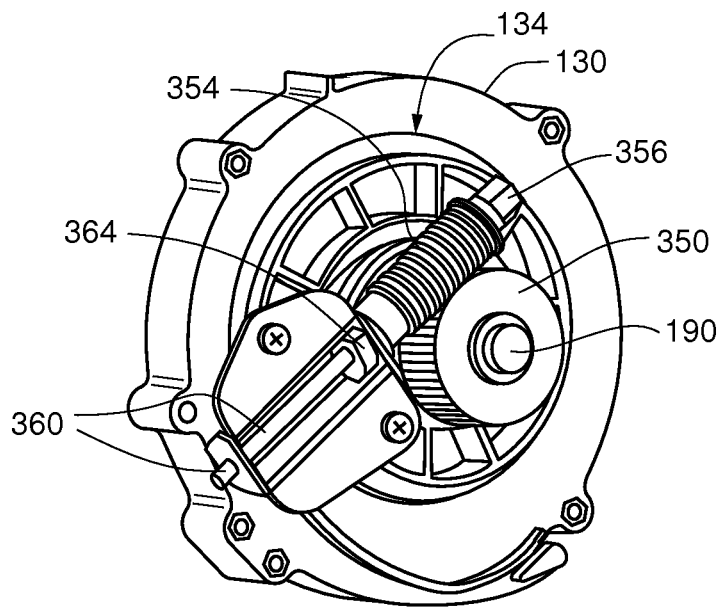
FIG. 13A is a perspective view of a tensioning mechanism in accordance with an embodiment of the invention.

In some embodiments the tensioning mechanism includes a gear mechanism coupled with the second end of the spiral spring via the spring axle. For example, turning to FIG. 13A, in some embodiments a disk gear 350 including a number of teeth around a periphery of the gear is attached to the axle 190 for turning the axle 190. Although the tensioning mechanism is shown with the balance mechanism 130 of FIG. 6 including the cam member 134, tensioning mechanisms may also be incorporated with the embodiment of FIG. 2 including a balance mechanism without a cam member. As shown in FIG. 13A and in FIG. 13B, in some embodiments the axle 190 is provided with an integral gear member 352 and the disk gear 350 engages the axle 190 by engaging the integral gear member 352. The disk gear 350 can thus be used for adjusting the tension of the spiral spring 160 in order to accommodate different loads.

In some embodiments the disk gear 350 may be controllably rotated by a secondary gear. For example, in the embodiment shown in FIGS. 13A and 13B, a lead screw or worm gear 354 engages the disk gear 350 to provide measured rotation of the disk gear 350 in order to adjustably rotate the axle 190 and adjust the tension of the spiral spring 160. In certain embodiments the worm gear 354 includes a drive head 356 configured to allow a tool (e.g., a screw driver, ratchet, etc.) to turn the worm gear 354. As shown in FIGS. 1 and 5A-5C, in some embodiments the drive head 356 may protrude from the base of the display positioning apparatus to provide easy access for adjusting the tensioning mechanism. In some embodiments the worm gear 354 is provided with a knob or lever for hand manipulation. Accordingly, in some embodiments a gear mechanism including the disk gear 350 and the worm gear 354 provides controlled and measured adjustment of the tension of the spiral spring 160. In addition, the engagement of the worm gear and disk gear fixes rotation of the disk gear 350 and axle 190, thus holding the second end 184 of the spiral spring 160 stationary as the cam member 134 and housing 150 rotate about the axle 190.

In certain embodiments the tensioning mechanism includes a limiting mechanism to ensure that the spiral spring 160 is not over-tensioned. For example, in some cases the gear mechanism shown in FIGS. 13A and 13B includes a threaded shaft 360 coupled to the worm gear 354 (threading not shown in FIGS. 13A and 13B). The shaft 360 is movably mounted within a retaining bracket 362 and includes a stop bracket 364 coupled to the shaft. As the worm gear 354 is turned to tighten and loosen the tension of the spiral spring 160, the stop bracket 364 travels up and down the threaded shaft 360. As the tensioning mechanism reaches its tension limit and/or a relaxation limit, the stop bracket 364 engages the retaining bracket 362 and prevents further rotation of the worm gear 354, the disk gear 350 and the axle 190. In some cases the stop bracket 364 is configured as an indicator to show a user how much tension has been applied to the spiral spring 160.

Figure 13B:
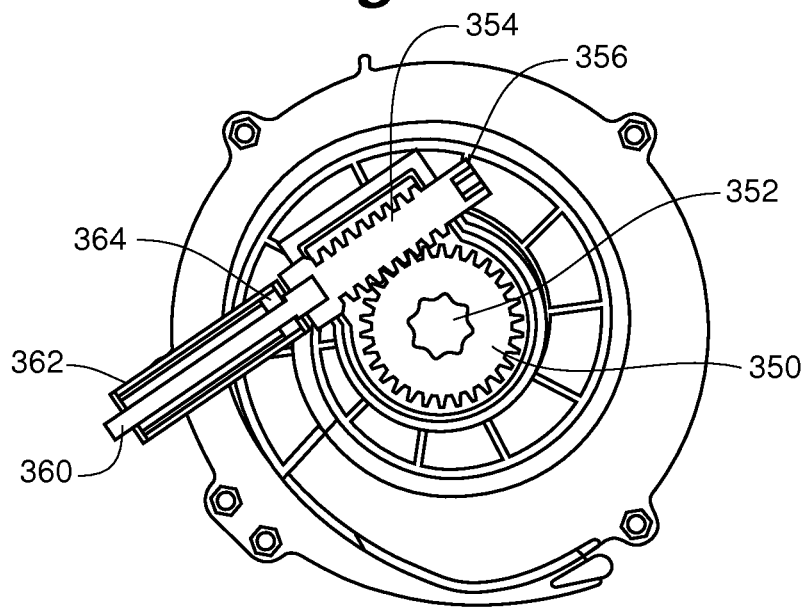
FIG. 13B is a partial cross-sectional view of the tensioning mechanism of FIG. 13A in accordance with an embodiment of the invention.
Figure 14A:
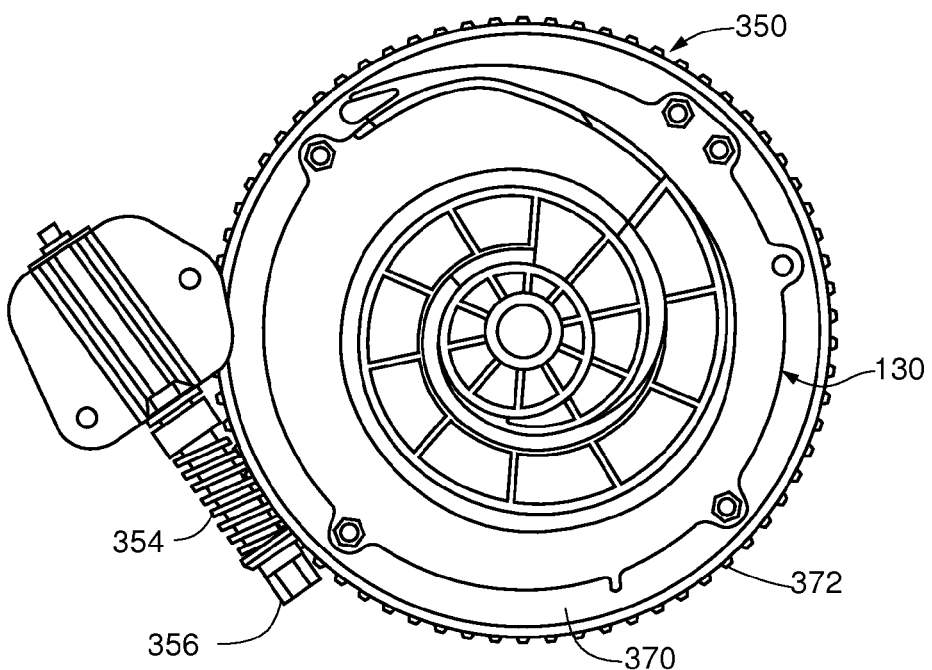
FIG. 14A is a side view of a balance mechanism and a tensioning mechanism in accordance with an embodiment of the invention.
Figure 14B:
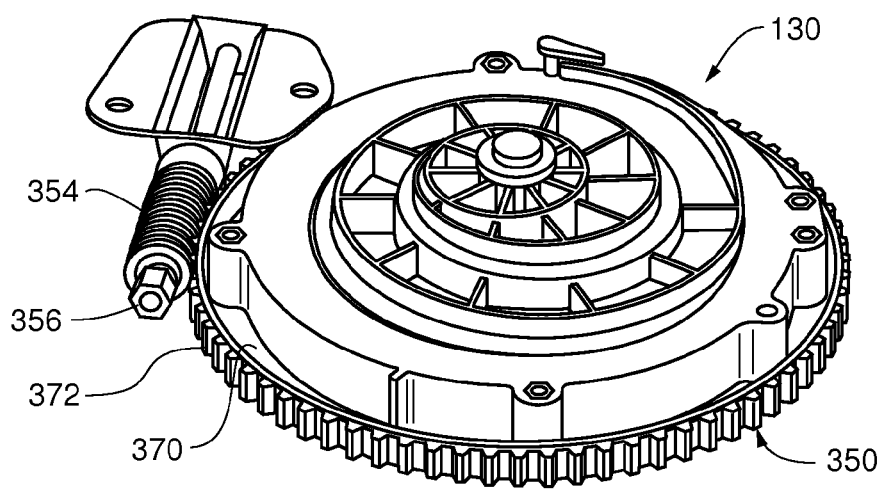
FIG. 14B is a perspective view of the balance mechanism and tensioning mechanism of FIG. 14A in accordance with an embodiment of the invention.

FIGS. 14A and 14B illustrate another tensioning mechanism in accordance with an embodiment of the invention. In this case, the disk gear 350 comprises a plate member 370 with a diameter extending beyond the diameter of the balance mechanism 130. The disk gear 350 further includes a cylindrical wall 372 having a plurality of teeth for engaging the worm gear 354. The cylindrical wall 372 and teeth extend around the housing of the balance mechanism 130, thus allowing the worm gear 354 to engage the disk gear 350 in roughly the same plane as the balance mechanism 130. Such a configuration can provide a relatively thin profile for the balance mechanism, allowing the balance mechanism 130 to be installed in relatively thin and flat cavities, such as the planar portion 103 of the base 114 shown in FIGS. 5A-5C. In contrast, the tensioning mechanism shown in FIGS. 13A and 13B is configured to engage the balance mechanism 130 at its side, thus providing a wider profile, but a smaller overall diameter for the balance mechanism 130 and tensioning mechanism. Accordingly, either configuration may be useful depending upon the size constraints of a particular embodiment.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A display positioning apparatus, comprising:
   a base;
   a lift arm pivotally coupled to the base about a pivot axis providing a range of travel, the lift arm adapted to couple with a display to move the display along the range of travel;
   an elongated tension member coupled to the lift arm; and
   a balance mechanism that includes a housing containing a torquing spring member and a cam member formed on a surface of the housing,
   wherein the cam member is coupled to the tension member and has a cam surface about which the tension member winds as the cam member rotates in a first direction and unwinds as the cam member rotates in a second direction; and
   the torquing spring member is engaged with the cam member providing a force opposing rotation of the cam member to counterbalance the lift arm and the display along the range of travel.

2. The display positioning apparatus of claim 1, wherein the cam member and the torquing spring member rotate about an axis of rotation substantially perpendicular to the pivot axis.

3. The display positioning apparatus of claim 2, wherein the base comprises a generally planar portion and a pivot portion extending from the planar portion, wherein the lift arm is pivotally coupled to the pivot portion of the base, and wherein the cam member and the torquing spring member are positioned within the planar portion of the base.

4. The display positioning apparatus of claim 1, wherein the torquing spring member tightens as the cam member rotates in the second direction and loosens as the cam member rotates in the first direction.

5. The display positioning apparatus of claim 1, wherein the torquing spring member is positioned coaxial with the cam member.

6. The display positioning apparatus of claim 1, wherein the torquing spring member comprises a spiral spring including a wire wound in a spiral from a center of the spiral spring to an outer diameter of the spiral spring and wherein the outer diameter of the spiral spring is engaged with the cam member and the cam member rotates relative to the center of the spiral spring.

7. The display positioning apparatus of claim 1, wherein the cam surface comprises a spiraling surface.

8. The display positioning apparatus of claim 1, wherein the cam surface extends through an angle of 360 degrees or more.

9. The display positioning apparatus of claim 1, further comprising means for adjusting a tension of the torquing spring member.

10. A display positioning apparatus, comprising:
    a base;
    a lift arm pivotally coupled to the base providing a range of travel, the lift arm adapted to couple with a display to move the display along the range of travel; and
    a balance mechanism operatively coupled to the base and the lift arm, the balance mechanism counterbalancing the lift arm to move the lift arm and the display along the range of travel, the balance mechanism comprising a housing containing a torquing spring member having a first end engaged with the housing and a second end rotatable with respect to the housing, wherein a cam member is formed on a surface of the housing and operatively coupled to the lift arm.

11. The display positioning apparatus of claim 10, further comprising an elongated tension member coupled to the lift arm and the housing, the cam member engaging the tension member as the housing rotates with respect to the base.

12. The display positioning apparatus of claim 10, wherein the housing comprises a first end plate, a second end plate, and a wall between the first and the second end plates, wherein the first end of the torquing spring member is engaged with the wall and the torquing spring member is contained between the first and the second end plates.

13. The display positioning apparatus of claim 12, wherein the first end plate has a first surface adjacent the torquing spring member and a second surface comprising the cam member.

14. The display positioning apparatus of claim 10, wherein the base comprises a generally planar portion and a pivot portion extending from the planar portion, wherein the lift arm is pivotally coupled to the pivot portion of the base, and the cam member and the torquing spring member are positioned within the planar portion of the base.

15. The display positioning apparatus of claim 10, further comprising an axle coupled to the housing, wherein the housing rotates about the axle and the second end of the torquing spring member is engaged with the axle.

16. The display positioning apparatus of claim 15, wherein the axle is rotatable with respect to the base and further comprising a tensioning mechanism for adjustably rotating the axle with respect to the base to adjust a tension of the torquing spring member.

17. The display positioning apparatus of claim 16, wherein the tensioning mechanism comprises a gear mechanism coupled to the second end of the torquing spring member.

18. The display positioning apparatus of claim 17, wherein the housing rotates about the axle and the gear mechanism is coupled to the second end of the torquing spring member through the axle.

19. The display positioning apparatus of claim 17, wherein the gear mechanism comprises a disk gear coupled to the axle and a worm gear engaged with the disk gear.

20. The display positioning apparatus of claim 19, further comprising a limiting mechanism coupled with the gear mechanism to prevent over-tensioning of the torquing spring member.

21. The display positioning apparatus of claim 20, wherein the limiting mechanism comprises a shaft coupled to the worm gear and a retaining bracket, wherein the shaft is movably mounted in the retaining bracket and a stop bracket coupled to the shaft restricts movement of the shaft with respect to the retaining bracket.

22. The display positioning apparatus of claim 19, wherein the disk gear comprises a plate member coupled with a cylindrical wall having a plurality of teeth, the cylindrical wall extending around the housing of the balance mechanism.

23. The display positioning apparatus of claim 16, wherein the tensioning mechanism includes a tension indicator.

24. The display positioning apparatus of claim 10, wherein the cam member comprises a spiraling cam surface.

25. The display positioning apparatus of claim 24, wherein the cam surface extends through an angle of 360 degrees or more.

* * * * *